TELEPHONE SYSTEM SIGNALING
Filed Nov. 7, 1958
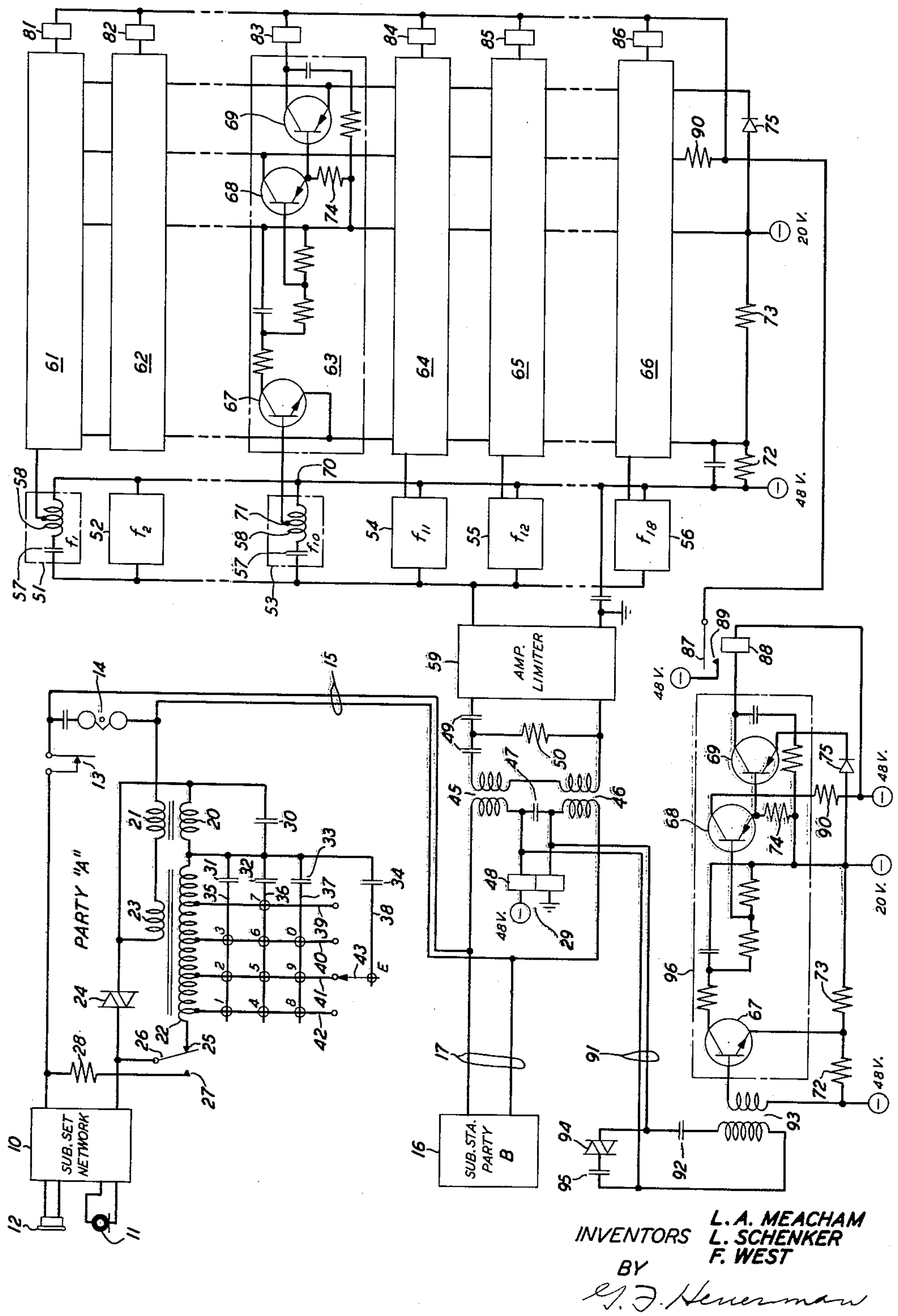
INVENTORS L. A. MEACHAM
L. SCHENKER
F. WEST
BY
G. J. Heuerman
ATTORNEY United States Patent Office 3,060,275

Patented Oct. 23, 1962

3,060,275

TELEPHONE SYSTEM SIGNALING

Larned A. Meacham, New Providence, Leo Schenker, Berkeley Heights, and Fred West, Mendham, N.J., assignors to Bell Telephone Laboratories, Incorporated, New York, N.Y., a corporation of New York Filed Nov. 7, 1958, Ser. No. 772,487
4 Claims. (Cl. 179—84)

This invention relates to telephone system signaling and more particularly to a multifrequency dialing system.

An object of the invention is to provide improved signaling apparatus for selectively transmitting voice frequency dialing signals and, simultaneously with each dial signal, a distinctive frequency signal for enabling dial signal receiving apparatus.

Another object is to provide a multifrequency dialing system having means for transmitting a distinctive frequency, end-of-dialing signal.

In accordance with a specific embodiment of the invention, herein shown and described for the purpose of illustration, there are provided at each of a plurality of subscriber stations of a telephone system a multifrequency dial pulse generator and a single frequency enabling pulse generator. The enabling pulse generator comprises a first transformer having primary and secondary windings preferably wound on a ferrite core. A condenser is connected across the transformer primary to form a parallel resonant circuit. The dial pulse generator comprises a second transformer having primary and secondary windings and, preferably, a ferrite core. There are provided a plurality of condensers of different capacitances, respectively, and means for selectively connecting the condensers across portions at least of the primary of the second transformer to form tuned circuits which are resonant to different frequencies, respectively. A push-button operated switching apparatus is preferably provided for selectively connecting the condensers to the primary of the second transformer. One of the push buttons is provided for sending an end-of-dialing signal which also serves as a party identification signal.

There is provided a constant voltage device for setting up a substantially constant voltage across its terminals in response to direct current of sufficient amplitude flowing through said device. The constant voltage device and the secondary windings of the first and second transformers are series connected in a current path going to one side of the subscriber's loop. Closure of the switchhook contact in the subscriber's set causes current from a central office battery to be supplied through the secondary windings and the constant voltage device, all in series, to set up a substantially constant voltage across the constant voltage device. With the switchhook contact closed, the transformer primaries, in series, are normally connected across the constant voltage device to cause a fixed current to flow through the transformer primaries. Each push button, when operated, opens the energizing circuit for the transformer primaries to cause the generation of two transient oscillatory current waves simultaneously in the tuned circuits and these waves are transmitted through the transformer secondaries and the subscriber's loop to the central office. Each push button, when operated, also completes a low resistance shunt path across the subscriber's set network to prevent speech current interference with the digit or dialing signals and the enabling signal.

At the central office, the digit or dialing signals and the end-of-dialing and party identification signals, after amplification and amplitude limitation, are separated or selected by means of tuned circuits. After further amplification, the signals are utilized to operate registering relays. The enabling signal received at the central office is also selected by means of a tuned circuit and, after amplification, is utilized to operate an enabling relay. The enabling relay, when operated, completes an energizing circuit for the registering relays, thereby substantially preventing false operation of the registering relays.

The invention will now be described in greater detail with reference to the accompanying drawing, the single FIGURE of which is a schematic view of a telephone signaling system embodying the invention.

Referring to the drawing, there is shown subscriber's station apparatus for a party A comprising a subscriber's set network 10 to which a microphone 11 and a telephone receiver 12 are connected, a switchhook contact 13, and a ringer 14. A loop 15 is provided for connecting subscriber station A to a central office. Each of a plurality of other subscriber stations, equipped similarly to subscriber's station A, is also connected to the central office by means of a subscriber's loop which, in the case of a party line, is shared at least in part by two or more stations. Subscriber's station 16 of a party B is connected to the central office by a branch 17 of subscriber's loop 15, for example. It will be understood that details of the apparatus used in the telephone system for speech transmission and for interconnecting subscriber's stations have been omitted from the disclosure to simplify it and thus facilitate the understanding of this invention. The subscriber's signalling apparatus is shown only at the subscriber's station for party A, it being understood that similar apparatus is provided at each of a plurality of subscriber's stations.

There are provided at the subscriber's station for party A a first transformer having a primary winding 20 and a secondary winding 21, preferably wound on a ferrite core, and a second transformer having a tapped primary winding 22 and a secondary 23, preferably wound on a ferrite core. There is also provided a constant voltage device 24 which comprises a pair of oppositely poled diodes in parallel for setting up across the device a substantially constant voltage when direct current of sufficient magnitude flows through the device in either direction. When switchhook contact 13 is closed by removing the telephone handset from its cradle, for example, current from the central office battery at 29 is transmitted over the loop 15 through a circuit comprising secondary transformer windings 21 and 23, constant voltage device 24, the subscriber's set network 10 and switchhook contact 13, all in series, to set up a substantially constant voltage across the diodes 24. Transformer primary windings 20 and 22, in series, are connected across the diodes 24 through the closed contact 25 of a switch 26. The armature of switch 26 may be actuated, as will be described below, to open contact 25 and to close a contact 27, thereby completing a low resistance shunt path comprising a resistor 28 across the network 10.

A condenser 30 is connected across the transformer winding 20 to form a parallel resonant circuit. Each opening of contact 25 of switch 26 causes the generation of a transient sinusoidal wave of the frequency to which the parallel resonant circuit 20, 30 is tuned. These signaling wave pulses are induced into the secondary transformer winding 21 and transmitted over loop 15 to the central office where they are utilized to condition a circuit for operating registering relays. These pulses are therefore called enabling pulses and the means for producing the pulses is called the enabling pulse generator. The enabling pulse may have a frequency of 150 cycles per second, for example.

A plurality of condensers 31, 32, 33 and 34 are provided, the condensers having a common terminal connected to the common terminal of windings 20 and 22. The other terminals of condensers 31, 32, 33 and 34 are connected to horizontal conductors 35, 36, 37 and 38, respectively. The taps on winding 22 are connected to vertical conductors 39, 40, 41 and 42. Push buttons or keys designated by the digits 1 to 9, inclusive, and 0 are provided for selectively bringing horizontal conductors 35 to 37 into engagement with vertical conductors 39 to 42 by depressing the push buttons one at a time in any desired sequence. There are thus provided a plurality of parallel resonant circuits for generating transient oscillatory waves of different frequency, respectively, the generation of each wave pulse being started by the opening of contact 25 of switch 26. These pulses are called digit or dial pulses herein.

There is also provided a push button designated by the letter E over the crosspoint of horizontal conductor 38 and a vertical conductor 43. Vertical conductor 43 may be connected by an installer to any one of vertical conductors 39 to 42. Horizontal conductor 38 is connected to one terminal of condenser 34, the other terminal of which is connected to a common terminal of windings 20 and 22. Depressing push button E brings conductors 38 and 43 into engagement to form a parallel resonant circuit for generating a transient sinusoidal wave having a frequency which differs from the frequency of the enabling pulse and from the frequencies of the dial or digit pulses, respectively.

Each push button 1 to 0 and E, when operated, actuates the armature of switch 26 to open its contact 25 and to close its contacts 27. The push-button arrangement may be constructed similarly to the push-button dialing apparatus disclosed in U.S. Patent No. 2,824,173 to L. A. Meacham, February 18, 1958, for example.

Operation of any push button 1 to 0 will cause the generation and transmission of a digit pulse having one of ten frequencies in the range from 1111 cycles per second to 2868 cycles per second, for example, accompanied by an enabling pulse having a frequency of about 150 cycles per second, for example. Operation of the push button E will cause the generation and transmission of an end of dialing and party identification pulse having one of eight frequencies in the range from 478 cycles per second to 1000 cycles per second, for example, accompanied by the enabling pulse. When contact 25 of switch 26 is closed, there is impressed across the windings 20 and 22, in series, the substantially constant voltage drop across the diode 24. The initial or maximum amplitude of each transient oscillatory wave which is generated is therefore substantially constant. Thus maintaining the transient wave amplitude substantially constant has the advantage of easing the sensitivity requirements of the apparatus at the central office for selecting the transient waves. The voltage across the secondary transformer winding 23 is proportional to frequency, thereby compensating, in part at least, for the attenuation of the loop 15 which increases with increasing frequency. While any push button is depressed, the speech transmitter is effectively disabled so as to prevent the transmission to the central office of speech or noise current which might cause false operation of the pulse signal receiving apparatus at the central office. The pulse receiver at the central office will be effectively activated by a digit or end-of-dialing pulse only when accompanied by the 150 cycle enabling pulse. This frequency is chosen to be below the band of the microphone 11 so that speech or noise currents cannot operate the pulse receiver when switch contact 27 is open. It is thus seen that voice frequencies resulting from talk or background noise will not cause the registration of a digit because the transmitter is disabled during a push-button operation and the central office receiver is not enabled for registering digits between push-button operations.

The subscriber is impelled to depress the push button E to send a party identification pulse since the pulse also serves as an end-of-dialing signal and the receiving apparatus will not act upon the dialed information to complete the call until the end-of-dialing pulse is transmitted and received. Transmission of a pulse for indicating end of dialing makes possible the transmission of a reduced number of dialing pulses for local or intra-office calls, four digits, for example.

At the central office there are provided a conventional repeating coil with balanced pairs of windings 45 and 46, condenser 47, supervisory relay 48 and a network comprising series condensers 49 and a shunt resistor 50. One conductor of the loop 15, for example, is connected through the primary of windings 45 and the supervisory relay 48 to the negative terminal of 48 volt battery 29, and the other conductor of the loop is connected through the primary of windings 46 and the supervisory relay 48 to the grounded battery terminal. The digit and end-of-dialing pulses are transmitted through the secondaries of both pairs of windings 45 and 46 of the repeating coil, the network 49, 50 and an amplifier-limiter 59 to a plurality of resonant circuits tuned to the frequencies, respectively, of the transient wave pulses which may be generated by operating the push buttons 1 to 0 and E. The limiting amplifier 59 may be of the type disclosed in U.S. Patent 2,986,603, issued to L. A. Meacham May 30, 1961, for example. It provides an output signal of substantially constant amplitude. There are provided ten tuned circuits, of which only three, 51, 52 and 53, are shown, for receiving the digit pulses which are generated in response to the operation of keys 1 to 0. Eight tuned circuits, of which only three, 54, 55 and 56, or shown, may be provided for receiving the party or end-of-dialing pulses of different frequency produced by operating the push buttons E in different subscribers' sets, respectively. Each of the tuned circuits 51 to 56 comprises a capacitor 57 and an inductor 58, in series.

There are provided a plurality of similar power amplifiers 61 to 66, inclusive, one for each of the tuned circuits 51 to 56, inclusive. Each of these amplifiers comprises transistors 67, 68 and 69 and other circuit components as disclosed in an application of L. A. Meacham and L. Schenker, Serial No. 743,434, filed June 20, 1958. Each of the tuned circuits 51 to 56 includes a first terminal 70 connected to negative 48 volt battery and a second terminal 71 connected to the base of transistor 67. The emitter of transistor 67 is biased positively with respect to the base by means of a voltage divider comprising resistors 72 and 73 which are connected between negative 48 volt battery and negative 20 volt battery, the positive battery terminal being grounded. The collector of transistor 67 which is connected to negative 20 volt battery is therefore nonconducting unless the output of the tuned circuit 53 is of sufficient amplitude to overcome the emitter bias. The output of transistor 67 is coupled to a two-stage amplifier comprising transistor 68 and 69. The emitter of transistor 68 is connected through a resistor 74 to the negative 20 volt terminal and the emitter of transistor 69 is connected through a bias-producing diode 75 to the negative 20 volt terminal. The diode 75 requires a drop of several tenths of a volt across its terminals in the forward direction before it conducts, an action closely related to the voltage regulating action of diodes 24, and it thus prevents conduction of transistor 69 except when this drop or bias is overcome by voltage developed across resistor 74.

There are provided a plurality of registering relays 81 to 86, inclusive, one for each of the amplifiers 61 to 66, inclusive. Output terminals of amplifiers 61 to 66 are connected to terminals of relays 81 to 86, respectively. A common terminal of relays 81 to 86 is connected to the armature 87 of an enabling relay 88 which has a contact 89 connected to negative 48 volt battery. The collector of transistor 69 of the amplifier 63 is connected through the winding of relay 83 to negative 48 volt battery when the relay 88 is energized to cause the armature 87 to engage the contact 89. When the relay 88 is thus operated, the collector of transistor 68 is connected through a resistor 90 to negative 48 volt battery. Therefore, when a transistor 67 is made conducting by a signal from the tuned circuit 53, for example, current flows from negative 20 volt battery through resistor 74 into the emitter and out of the collector of transistor 68 and through resistor 90 to negative 48 volt battery, and current flows from negative 20 volt battery through biasing element 75, into the emitter and out of the collector of transistor 69 and through relay 83 to negative 48 volt battery. Relay 83 is thus operated to cause it to register the signal.

The enabling pulse signals generated in the parallel resonant circuit 20, 30 at the subscriber's station and transmitted over the loop 15 to the central office are supplied through primary windings of repeating coil 45, 46 and conductors 91 to a series resonant circuit comprising a condenser 92 and the primary winding of a transformer 93, this circuit being tuned to the substantially 150 cycle per second frequency of the signal generated by the tuned circuit 20, 30. A current path comprising a varistor 94 and a condenser 95, in series, is connected across the tuned circuit 92, 93 to limit the voltage impressed across the tuned circuit, thereby preventing shock excitation of the tuned circuit.

There is provided an amplifier 96, like each of the amplifiers 61 to 66, inclusive, the corresponding parts thereof being designated by the numerals used for designating the parts of the amplifier 63. The base-emitter path of transistor 67 comprises, in series, the secondary of transformer 93 and the resistor 72. It will be noted that the base of transistor 67 is biased negatively with respect to its emitter due to the voltage drop across resistor 72 to cut off collector current in the transistor. The transistor 67 is made conducting in response to an enabling signal received by the tuned circuit 92, 93. As a result, current is supplied from the negative 20 volt terminal through biasing element 75 into the emitter and out of the collector of transistor 69 and through the winding of relay 88. The relay 88 is thus operated to cause it to connect negative 48 volt battery through its contact 89 and armature 87 to the common terminal of relays 81 to 86, inclusive. The registering relays 81, 82 and 83 are thus conditioned to be operated in response to digit or dial signals selected by tuned circuits 51, 52 and 53, and registering relays 84, 85 and 86 are conditioned to be operated in response to end-of-dialing and party identification signals selected by tuned circuits 54, 55 and 56.

What is claimed is:

1. In a telephone system, the combination of a telephone line, a source of direct current connected to said line, a telephone set including a transmitter connected across said line, a constant voltage device in series with one side of said line, a first resonant circuit including an inductive element and a capacitor connected in parallel, said first resonant circuit being tuned to a frequency outside the range of useful response of said transmitter, a tapped inductive element, a plurality of capacitors, means for selectively connecting said capacitors in parallel with the taps of said inductive element to produce a second resonant circuit tuned to a frequency indicative of a digit, said first and second resonant circuits connected in series across said constant voltage device, switch means operative under the control of said selective connecting means for opening the connection of said series resonant circuits across said constant voltage device whereby the energy stored in said inductive elements is converted into transient oscillatory waves and inductive means in series with said telephone line electromagnetically coupled to the inductive elements of said resonant circuits whereby the transient wave is induced upon the telephone line.

2. In combination, a first transformer having a first primary and a first secondary, a second transformer having a second primary and a second secondary, a first condenser connected across said first primary to form a first tuned circuit, a plurality of condensers, a plurality of keys for selectively connecting said plurality of condensers one at a time across a portion at least of said second primary to form a second tuned circuit, a source of direct current, a constant voltage device, means for transmitting current from said source through a circuit comprising said first and second secondaries and said constant voltage device all in series, switching means for connecting said first and second primaries in series across said constant voltage device, and means responsive to the operation of any of said plurality of keys for operating said switching means to open the circuit connecting said first and second primaries across said constant voltage device.

3. Telephone signaling apparatus comprising a constant voltage device, a first transformer having a first primary and a first secondary, a second transformer having a second primary and a second secondary, means for supplying current from a direct-current source to a circuit comprising said first and second secondaries and said constant voltage device all in series, a first condenser connected across said first primary to form a first tuned circuit, a plurality of condensers, a plurality of digit keys one for each digit for selectively connecting said plurality of condensers one at a time across a portion at least of said second primary to form tuned circuits, another condenser, an end-of-dialing key for connecting said other condenser across a portion at least of said second primary to form a tuned circuit, all of said tuned circuits being tuned to different frequencies respectively, and switching means under control of said digit and end-of-dialing keys for completing a circuit comprising said constant voltage device and said primaries all in series when all said keys are released and for opening said circuit when any of said keys is operated.

4. Apparatus for impressing alternating signaling currents upon a pair of conductors comprising a first transformer having a first primary and a first secondary, a second transformer having a second primary and a second secondary, a constant voltage device, means for supplying direct current from a supply source to a first circuit comprising said conductors, said first and second secondaries and said constant voltage device all in series, thereby setting up a substantially constant voltage across said constant voltage device, a second circuit comprising said first and second primaries in series across said constant voltage device, a first condenser connected across said first primary, a second condenser, and means for connecting said second condenser across a portion at least of said second primary and for substantially simultaneously opening said second circuit.

References Cited in the file of this patent

UNITED STATES PATENTS

| | | |
|---|---|---|
| 2,364,685 | Baker | Dec. 12, 1944 |
| 2,542,592 | Styren | Feb. 20, 1951 |
| 2,732,432 | Hullegard | Jan. 24, 1956 |
| 2,824,174 | Holman | Feb. 18, 1958 |
| 2,935,572 | Hastings et al. | May 3, 1960 |
| 2,951,911 | Van Lottum et al. | Sept. 6, 1960 |